United States Patent
Prabhu et al.

[11] Patent Number: 6,128,013
[45] Date of Patent: Oct. 3, 2000

[54] USER INTERFACE FOR AN IMAGE CAPTURE DEVICE

[75] Inventors: Girish V. Prabhu, Fairport; Walter C. Bubie, Rochester, both of N.Y.

[73] Assignee: Eastman Kodak Company, Rochester, N.Y.

[21] Appl. No.: 08/961,373

[22] Filed: Oct. 30, 1997

[51] Int. Cl.[7] .................................................. G06F 3/14
[52] U.S. Cl. ................................. 345/337; 345/350
[58] Field of Search .................................. 345/326, 337, 345/350, 349, 333, 334, 336

[56] References Cited

U.S. PATENT DOCUMENTS

| | | | |
|---|---|---|---|
| 5,228,123 | 7/1993 | Heckel | 395/155 |
| 5,367,388 | 11/1994 | Ossia | 358/518 |
| 5,367,624 | 11/1994 | Cooper | 345/350 |
| 5,369,508 | 11/1994 | Lech et al. | 358/462 |
| 5,412,773 | 5/1995 | Carlucci et al. | 395/156 |
| 5,442,746 | 8/1995 | Barrett | 395/161 |
| 5,596,753 | 1/1997 | Bhatt | 395/682 |
| 5,600,121 | 2/1997 | Kahn et al. | 235/472 |
| 5,692,111 | 11/1997 | Marbry et al. | 395/114 |
| 5,760,913 | 6/1998 | Falk | 358/298 |
| 5,799,298 | 8/1998 | Bingham et al. | 707/1 |

*Primary Examiner*—Raymond J. Bayerl
*Assistant Examiner*—David E. Brown
*Attorney, Agent, or Firm*—David M. Woods

[57] ABSTRACT

A graphical system interfaces user selections with an image capture device by means of a series of display screens produced by a processor and presented to the user on a display device. After initiating a setup process for establishing an image capture, a graphical interface is generated including a plurality of display screens that establish an intuitive setup procedure for an inexperienced user. More specifically, the interface is based on a progressive disclosure of the screens, in particular by representing one or more screens with user accessible icons, such as file tabs on file folders, which are expandable into additional screens according to user intervention. Thereupon, user interaction with, e.g., a selected tab of a selected file folder produces two or more additional folders related to the selected tab.

3 Claims, 14 Drawing Sheets

USER INTERFACE FOR AN IMAGE CAPTURE DEVICE

FIELD OF THE INVENTION

The invention relates to a user interface for a computer-connected device, and in particular to a user interface for a device used for image capture, viewing and enhancement, such as an image scanner.

BACKGROUND OF THE INVENTION

When designing an electronic document viewing and processing system, e.g., as a section of an document scanner or a similar capture device, the human interface with the system must support, above all other functions, the selection and enhancement of images. As used herein, the human (or user) interface refers to the totality of the human interaction with the system, and the means for enabling such interaction, e.g., including the information presented by the system to the user, and by the user to the system, as well as the devices that enable such presentations. The system must also provide the ability to apply actions against these images, such as displaying the images for review, selecting portions of the images for special processing, or enhancing the images via certain image parameter adjustments. Such a system will often employ a number of adjustments, which ideally requires some familiarity on the part of the user; therefore, it is important for the user interface to encourage interaction that is as intuitive as possible so as to quickly lead the user through the necessary adjustments.

In typical existing scanners the user interface consists of a single screen having fields for user entry of a number of scan instructions, including instructions that trigger the initial scan of the original material to generate an image, that provide rotate and trim parameters for the image, that set the parameters necessary for enhancement of the image, and that save the image according to the preceding instructions and parameters. Such an interface necessarily treats all users alike, requiring each of them to complete the necessary entries in a fixed manner. If the interface is simple, it can accommodate most users; if, however, it is difficult, it may impede inexperienced users.

In the Snapshot Photo Scanner 1™ manufactured by Eastman Kodak Company, a user is interfaced with an image scanner by means of a series of display screens produced by a processor and presented to the user on a display device. Two modes are provided for interfacing with the user to set up the scanner, including an expert mode which confines the process to a small number of display screens in order to provide a shorter, more compact setup procedure for an experienced user, and a step-by-step mode which expands the process into a larger number of display screens in order to provide a longer, more intuitive setup procedure for an inexperienced user.

Even with the existing step-by-step mode, each step, such as an image enhancement step, is still designed to present all options for that step. Novice users, therefore, may sometimes still be presented with a bewildering array of selections. Thus, none of the foregoing systems integrate the needs of novice users into a completely effective presentation that intuitively leads the novice user, regardless of skill, through the available choices and options.

SUMMARY OF THE INVENTION

The present invention is directed to overcoming one or more of the problems set forth above. Briefly summarized, according to one aspect of the present invention, a graphical system interfaces user selections with an image capture device by means of a series of display screens produced by a processor and presented to the user on a display device. After initiating a setup process for establishing an image capture, a graphical interface is generated including a plurality of display screens that establish an intuitive setup procedure for an inexperienced user. More specifically, the interface is based on a progressive disclosure of the screens, in particular by representing one or more screens with user accessible icons which are expandable into additional screens according to user intervention, wherein user interaction with a selected icon of a selected screen produces two or more additional screens related to the selected icon.

An advantage of the invention is that the progressive disclosure can take an intuitively familiar form for the inexperienced user. For example, the graphical interface may be based on a file folder metaphor, wherein the graphical interface is represented by one or more folders having user accessible icons represented by one or more user accessible tabs on the folders which are expandable according to user intervention. User interaction with a selected tab then produces two or more additional folders related to the selected tab.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image scanning devices and image viewing devices employing electronic sensors and electronic displays are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts. Furthermore, the user interface according to the invention is described for use with an electronic scanner, but it should be understood that it could be applied to other devices, such as electronic cameras, stand-alone image viewers and editors, and so on. Moreover, while the scanner is shown as cooperating with a separate host computer (such as a PC), it should be understood that the scanning and host functions could be combined in one unit.

Figure 1:
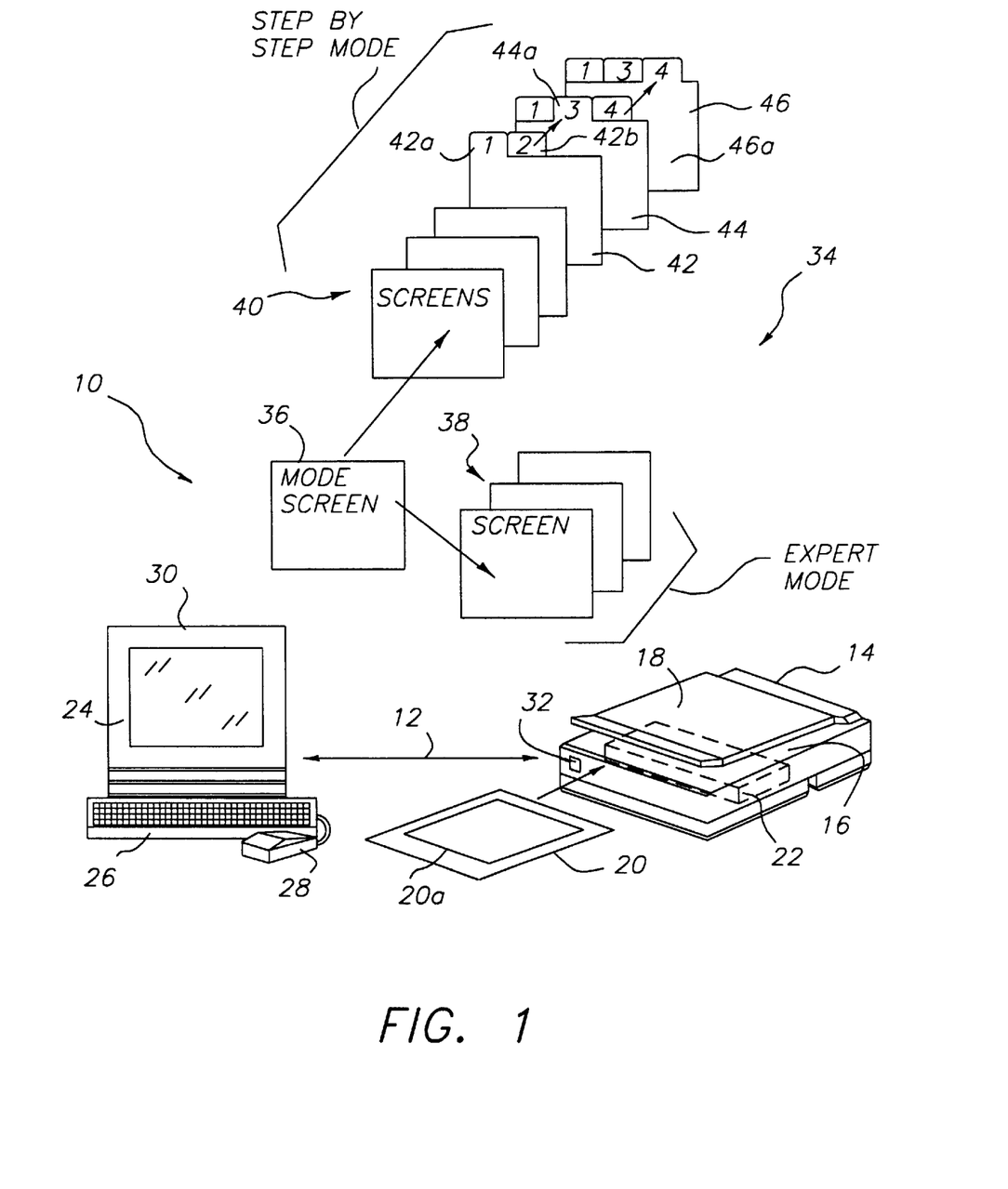
FIG. 1 is a diagram of a scanner and a host computer showing a schematic of the user interface according to the invention.

Referring to FIG. 1, a host computer 10 is shown coupled via a cable 12 to an input scanner 14. The input scanner 14 includes a scanning platen 16 and a pivotable lid 18 for positioning a document 20 against the platen 16. In the preferred embodiment, the document 20 includes an image 20a. The input scanner 14 uses a known scanning mechanism 22 for generating a plurality of scan lines of pixel data by generating relative movement between the document 20 and the scanning mechanism 22. For instance, the scanning mechanism 22 may include a linear array (not shown) that is movable with regard to the scanning platen 16.

The host computer 10 includes conventional components, such as a processor 24, a keyboard 26, a mouse 28, and a monitor 30. In response to depression of a start button 32 on the scanner 14 (or in response to a user command from the keyboard 26), software resident in the host computer 10 generates a sequence of user interface screens 34 presenting options to the user regarding what should be done with the document 20 or the scanned document image, such as to prescan the document 20 at low resolution for review and correction, or to scan the document 20 at high resolution for transfer to the host computer memory. As provided in the Snapshot Photo Scanner 1™ manufactured by Eastman Kodak Company, the sequence of user interface screens is preceded by a mode selection screen 36, which allows the user to select either an expert interface or a step by step interface. The expert interface is represented by a sequence of expert screens 38 that lead the experienced user through the options with a minimum of intervention. The step by step interface is represented by a sequence of step by step screens 40 that lead the inexperienced user through similar options with considerably more prompting and coaching.

In accordance with the invention, the step by step mode is further simplified for the inexperienced user by providing for the progressive disclosure of certain options. Progressive disclosure is implemented according to the invention by representing a graphical interface as one or more screens with user accessible icons which are expandable into additional screens according to user intervention. In particular, user interaction with a selected icon of a selected screen produces two or more additional screens related to the selected icon. In reference to FIG. 1, the progressive disclosure feature comprises a graphical interface based on a file folder metaphor in which the aforementioned icons are file tabs. ("Screen" is herein used to represent an image that occupies either all or just a part of the physical screen of a display device.) For instance, a step by step screen 42 is associated with an option 1, which appears on a tab 42a of the type that would be associated with a file folder. At this point, the user may enter data on screen 42 regarding option 1. The screen 42 further is displayed as overlying another folder (invisible to the viewer) having a tab 42b that identifies an option 2.

In this example, option 2 is a generic, or inclusive, option (e.g., "image enhancement") that encompasses a further selection of options, say an option 3 (e.g., "brightness adjustment") and an option 4 (e.g., "color balance"). Data for option 2 is thus entered by accessing options 3 and 4. Consequently, when the user clicks on the tab 42b with the mouse 28, option 2 is expanded into options 3 and 4. First, a step by step screen 44 is displayed for option 3, which is identified on a tab 44a. At this point, the user may enter data on screen 44 regarding option 3. The screen 44 further is displayed as if overlying screen 42 (which is invisible to the viewer of this screen) with only its tab 42a showing. In addition, a tab 46a is displayed in order to identify option 4. When the user clicks on the tab 46a a step by step screen 46 is displayed for option 4. At this point, the user may enter data on screen 46 regarding option 4. In this manner, the further options 3 and 4 are displayed by expanding upon the tab 42b (option 2).

Figure 2A:
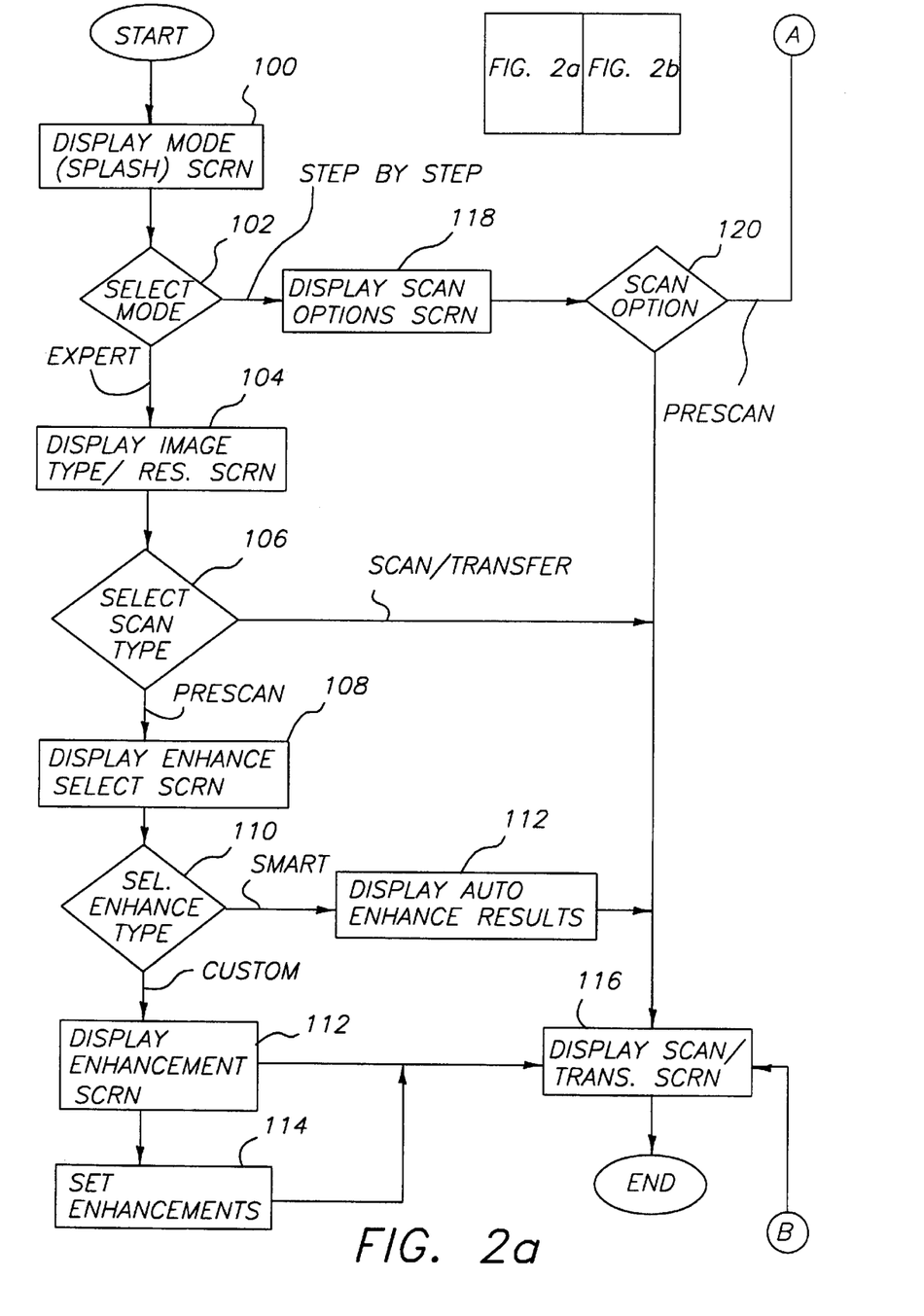
FIGS. 2A and 2B are flow diagrams showing the operation of the user interface.
Figure 2B:
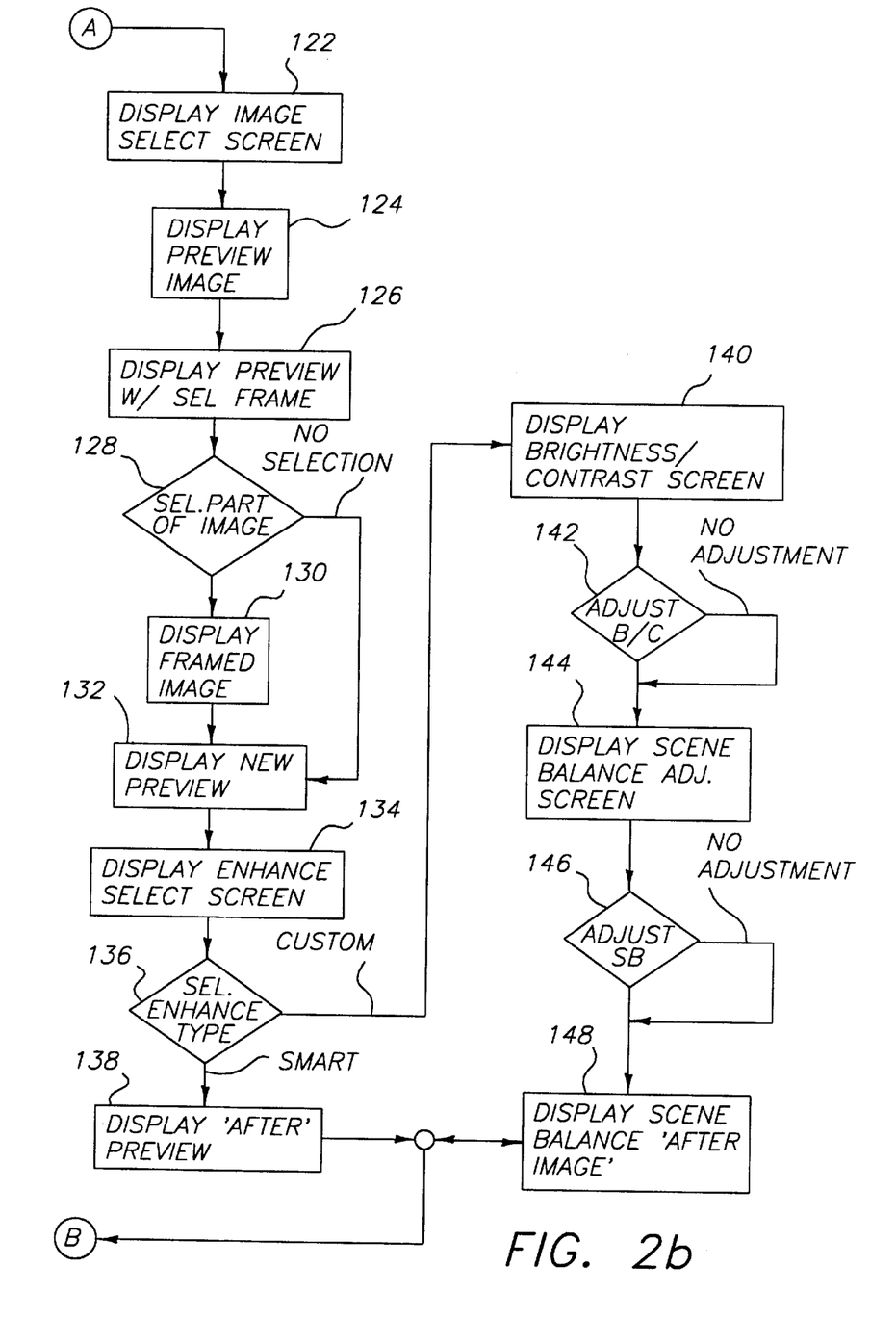
Figure 3A:
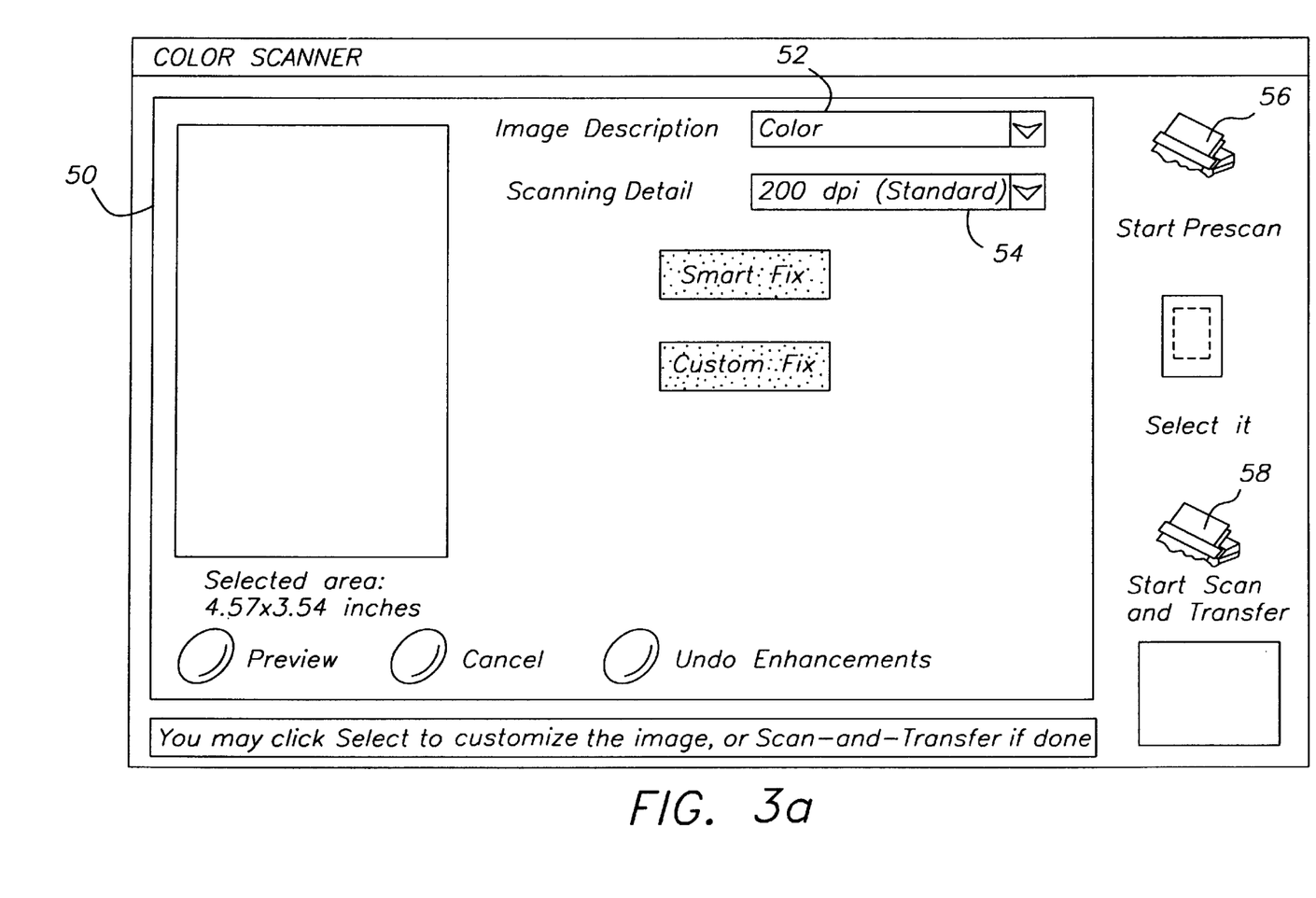
FIGS. 3A to 3C are screen diagrams showing the expert phase of the user interface.
Figure 3B:
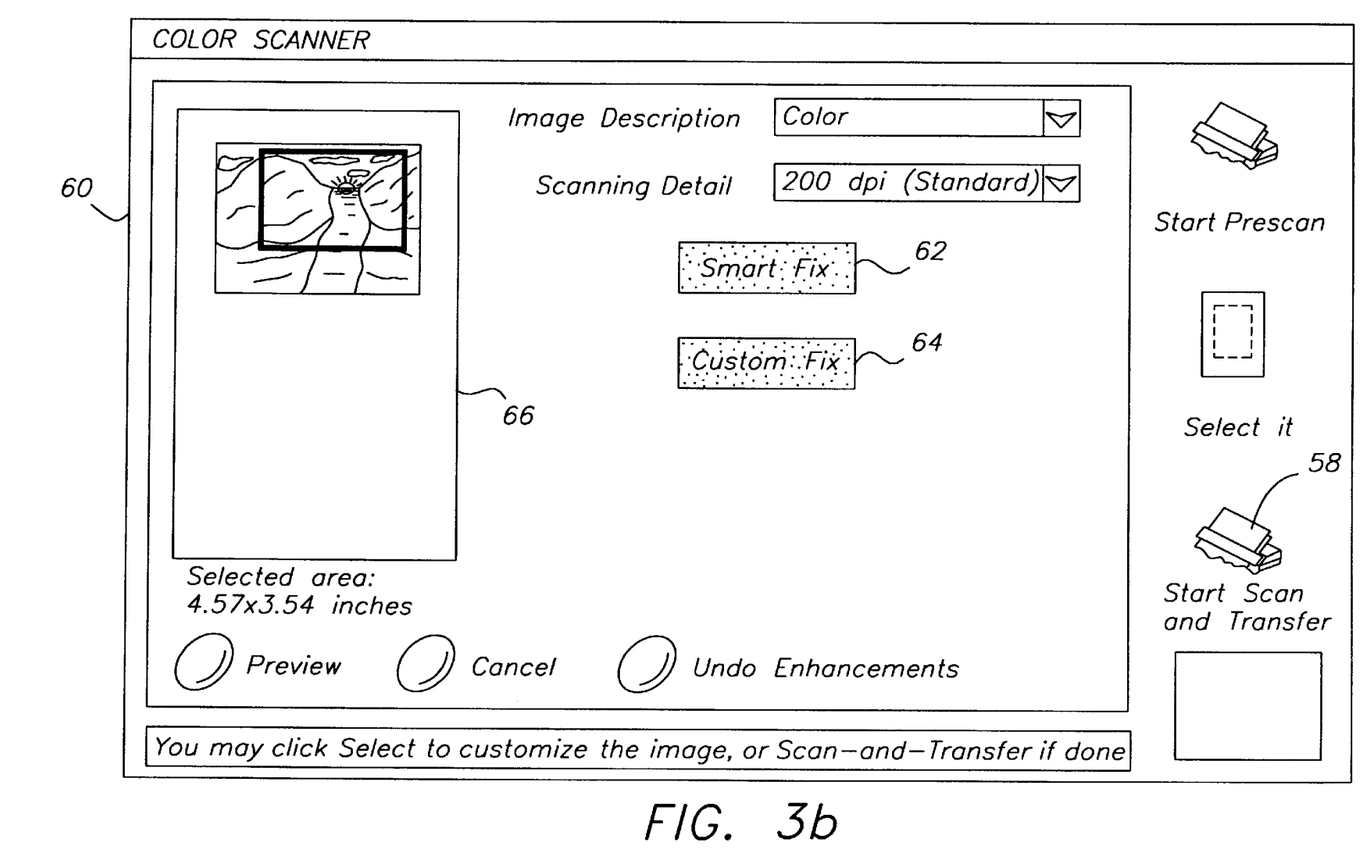
Figure 3C:
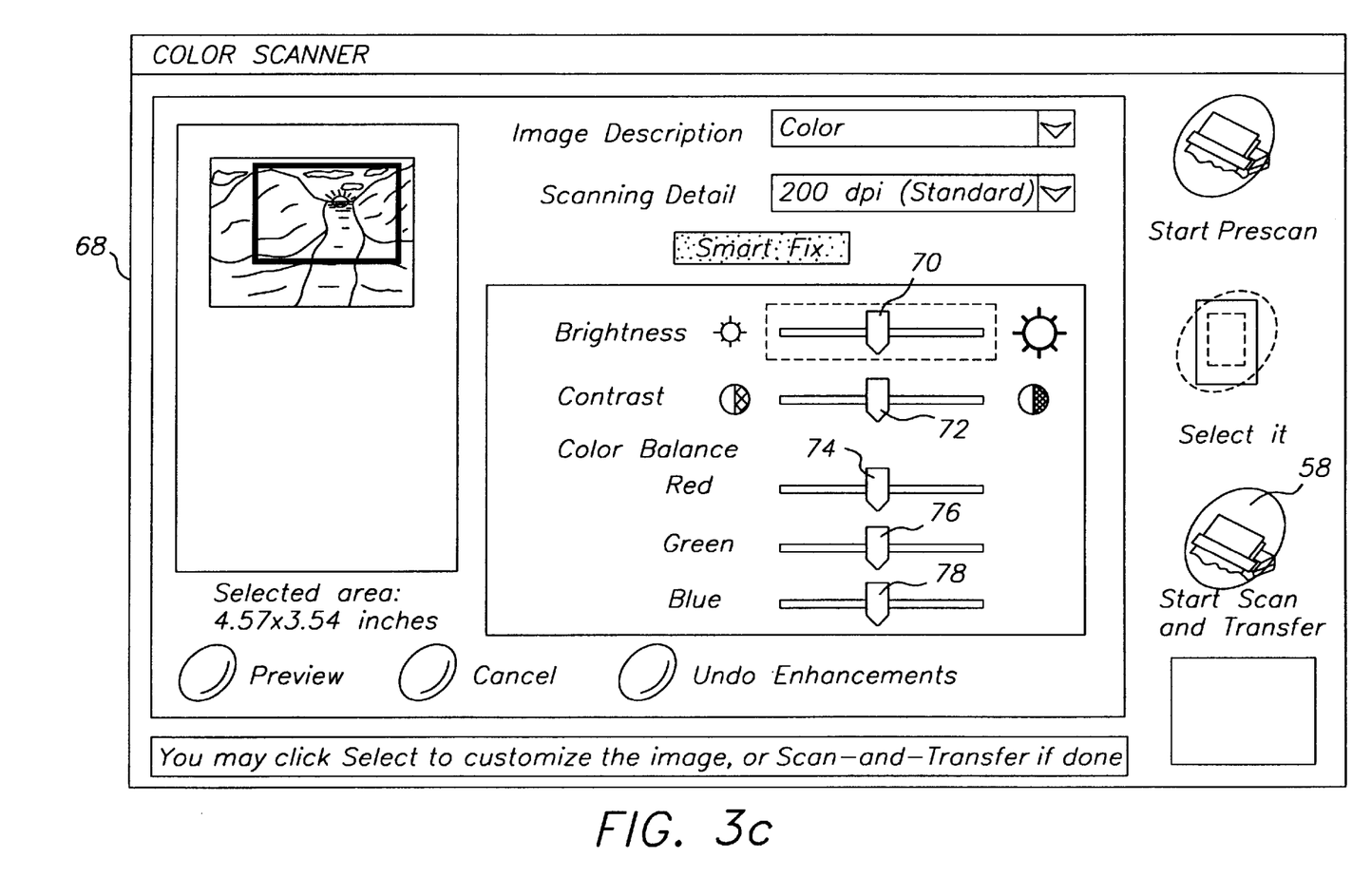
Figure 5:
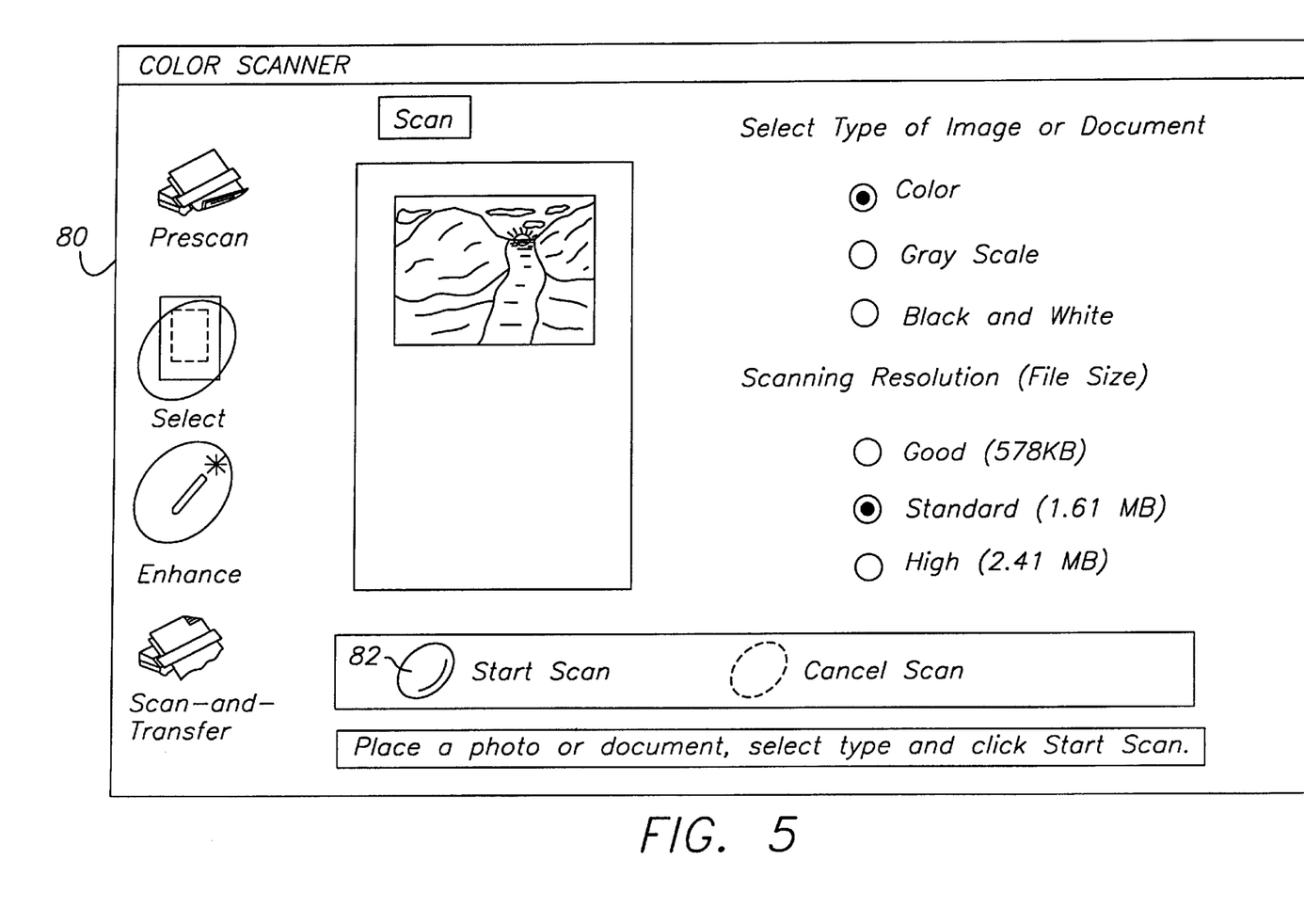
FIG. 5 is a screen diagram common to both phases of the user interface.
Figure 6:
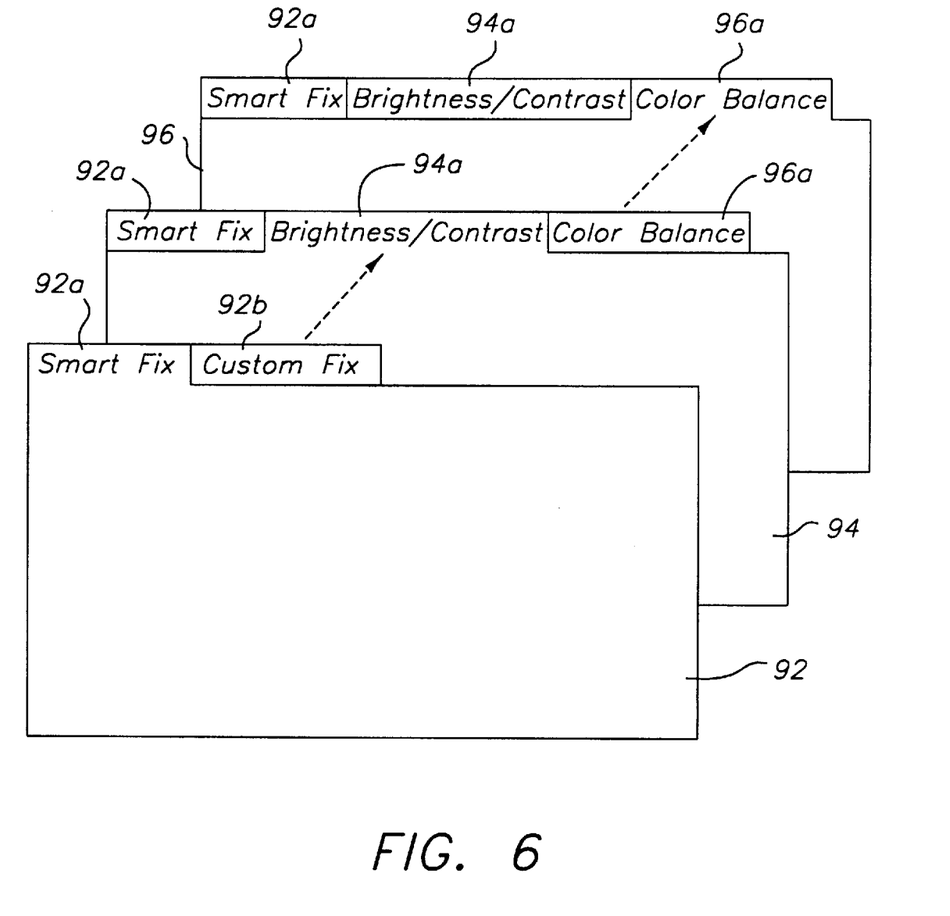
FIG. 6 is a diagram showing the progressive disclosure of options according to the invention.

A flow diagram for the interface procedure according to the invention is shown in FIGS. 2A and 2B; the flow will be described in relation to the user screens shown in FIGS. 3A–3C, 4A–4F, 5, and 6. FIGS. 3A–3C show the user interface screens 38 for the expert mode, FIGS. 4A–4F show the user interface screens 40 for the step by step mode including the progressive disclosure feature, FIG. 5 shows the scan and transfer screen shared by both modes, and FIG. 6 shows details of the progressive disclosure feature. (The various stages of the process flow shown in FIGS. 2A and 2B are shown as numbered steps in the following description.) Initially the mode select screen 36 is displayed (step 100) and the user selects between the expert mode and the step by step mode (step 102).

If the expert mode is selected, an image type/resolution screen 50 is displayed (step 104) as shown in FIG. 3A. Screen 50 includes an image description field 52 and a scanning detail field 54 for setting the respective parameters. At this stage, the scan type is selected (step 106) by clicking on either a prescan icon 56 or a scan-and-transfer icon 58. If the decision is to prescan, an enhancement select screen 60 is displayed (step 108) as shown in FIG. 3B, which enables a smart fix button 62 and a custom fix button 64. Smart fix refers to an automatic image enhancement procedure that operates directly on the scanned image data without any user intervention (other than to initiate the procedure by pressing the smart fix button 62). Custom fix, on the other hand, refers to a customized image enhancement procedure that involves a number of parameter choices by the user. If the user selects a smart fix (step 110) the results of the automatic enhancement are displayed within an image area 66 in the screen 60 (step 112) shown in FIG. 3B. If the user selects a custom fix (step 110) an enhancement screen 68 is displayed (step 112) as shown in FIG. 3C. Enhancement parameters are established by adjusting (step 114) a brightness slider 70, a contrast slider 72, and respective red, green, and blue sliders 74, 76, and 78. After all enhancements are completed, the user clicks on the scan and transfer icon 58 and a scan and transfer screen 80 is displayed (step 116), as shown in FIG. 5. The user then selects the type of document (color, greyscale, or black and white) and the scanning resolution (file size) and then clicks on a start scan button 82 to initiate a high resolution scan of the document.

Figure 4A:
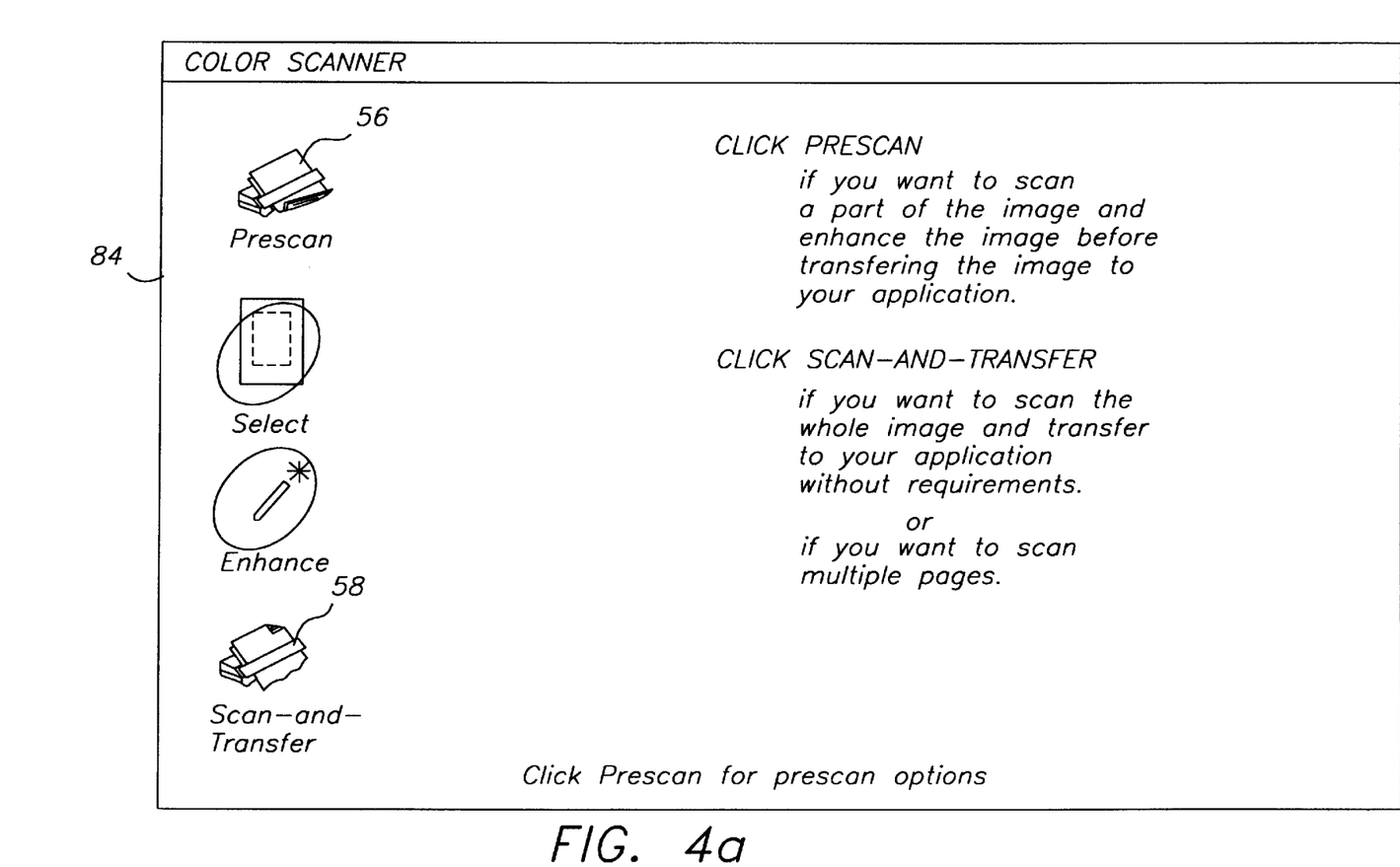
FIGS. 4A to 4F are screen diagrams showing the step by step phase of the user interface.
Figure 4B:
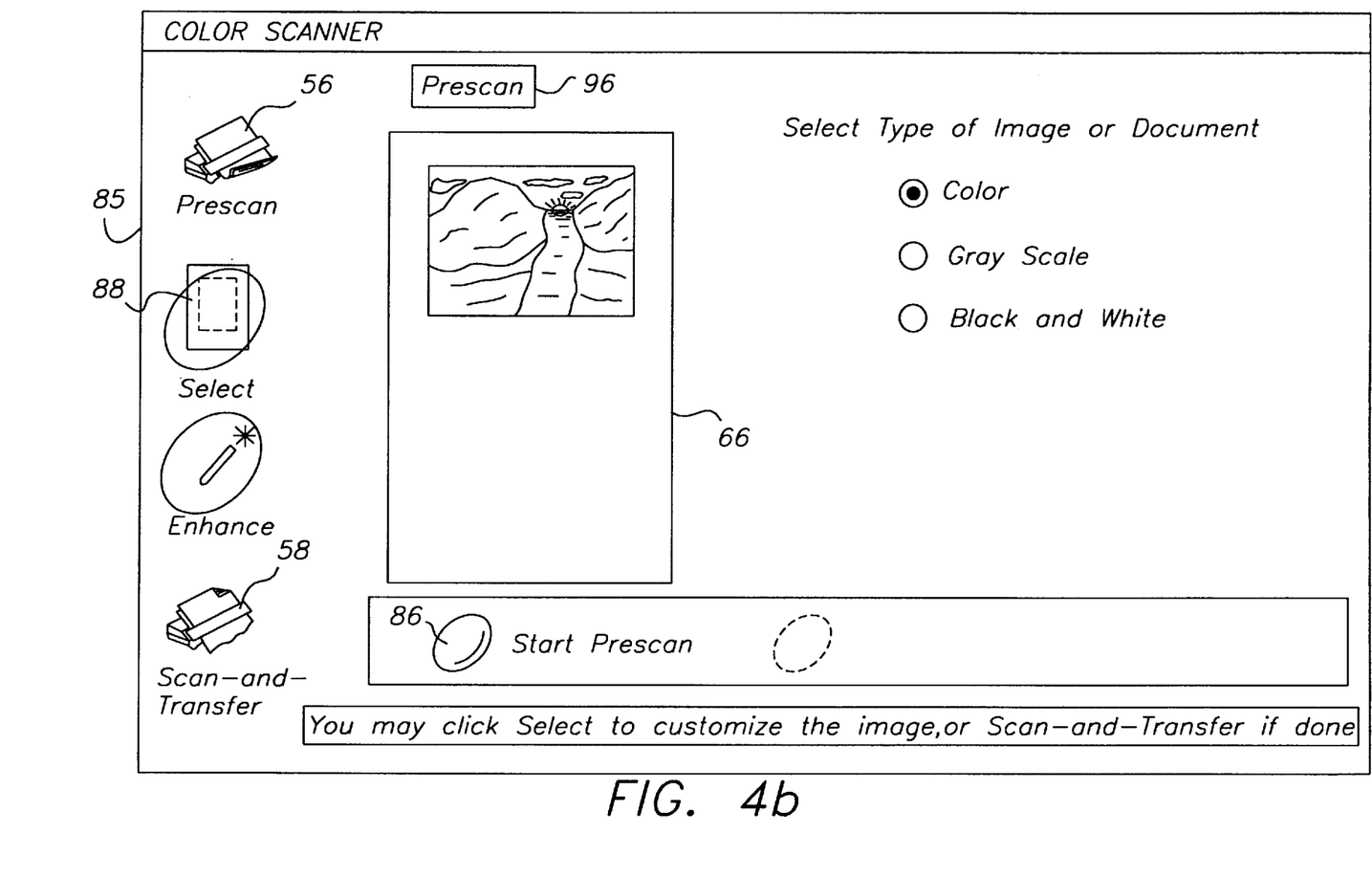

If the user selects the step by step mode (step 102) when the mode selection screen 36 is displayed, a scan options screen 84 is displayed (step 118) as shown in FIG. 4A. This screen offers the inexperienced user the option of either selecting the prescan icon 56 or the scan and transfer icon 58. Importantly, the screen is not cluttered with any other information that might distract or confuse the inexperienced user. If the scan and transfer icon 58 is selected (step 120) the aforementioned scan and transfer screen 80 is displayed (step 116) and the user sees the image type and resolution. If the prescan icon 56 is selected (step 120), the image select screen 85 is displayed (step 122) as shown in FIG. 4B. This screen prompts the user to select the type of image or document (color, gray scale, or black and white). When this is finished, the user clicks on a start prescan button 86 and the prescan process is initiated.

Figure 4C:
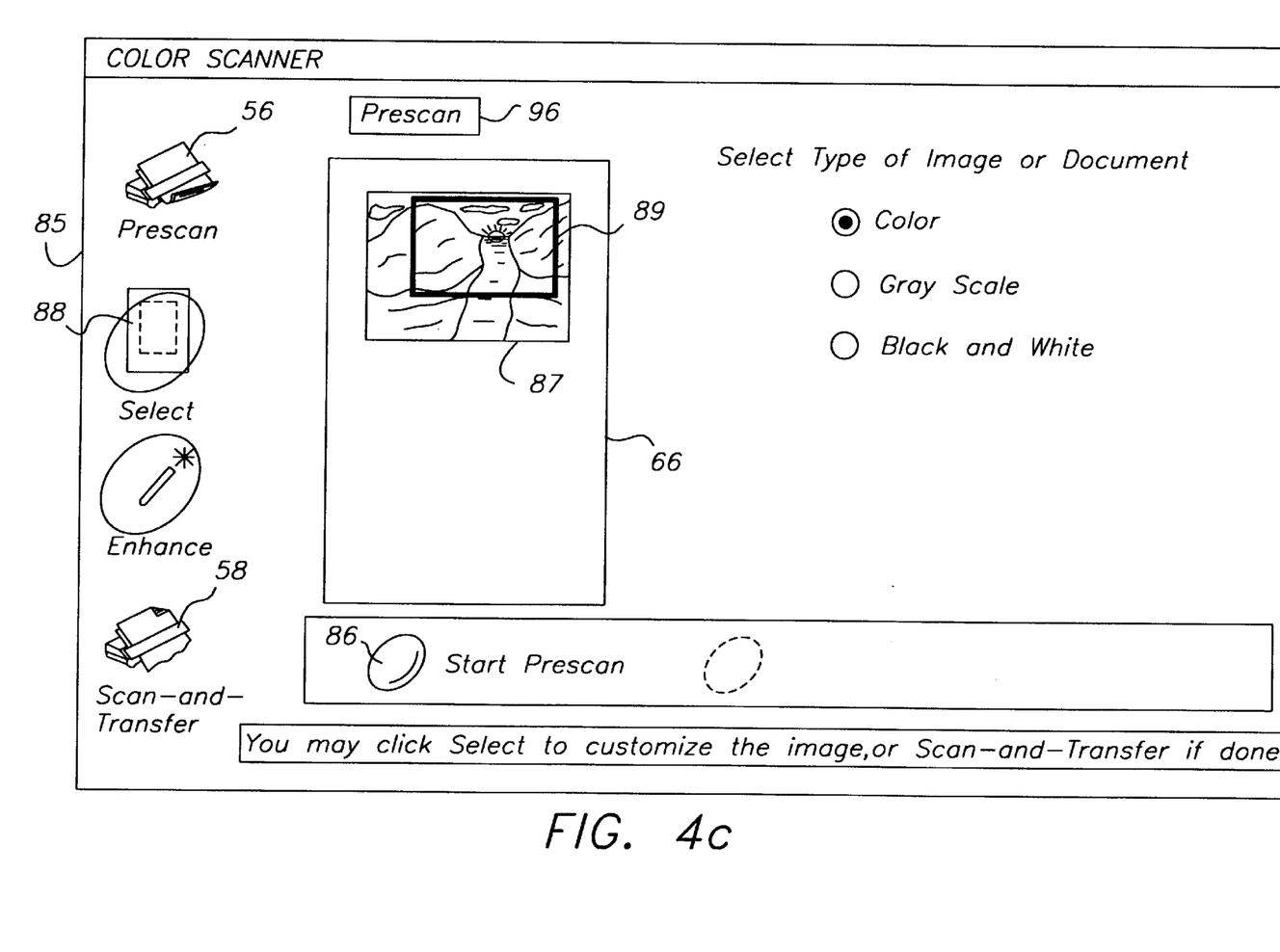

After prescan is completed, a preview image 87 is displayed (step 124) in the image window 66. The user may then click on a select icon 88 to display the preview image 87 with a select frame 89 (step 126) as shown in FIG. 4C. The select frame 89 may then (step 128) be moved and adjusted or not used at all by again clicking the select icon 88. If the framing has been adjusted the newly framed position is displayed (step 130); in either case, a new preview image is displayed (step 132). Next, an enhancement option screen 90 is displayed (step 134) as shown in FIG. 4D, and the image window 66 is separated into a before window 66a and an after window 66b.

Figure 4D:
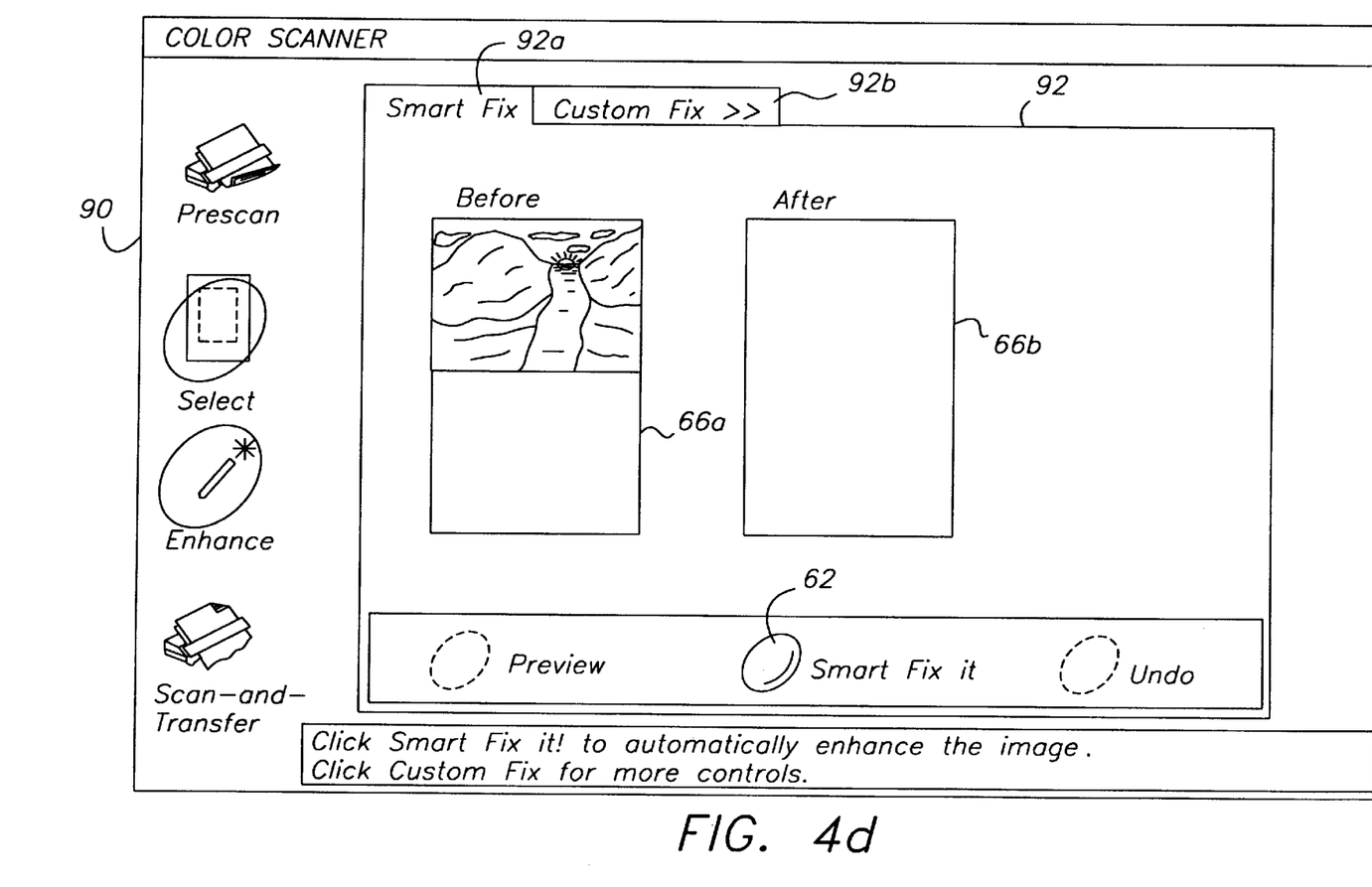
Figure 4E:
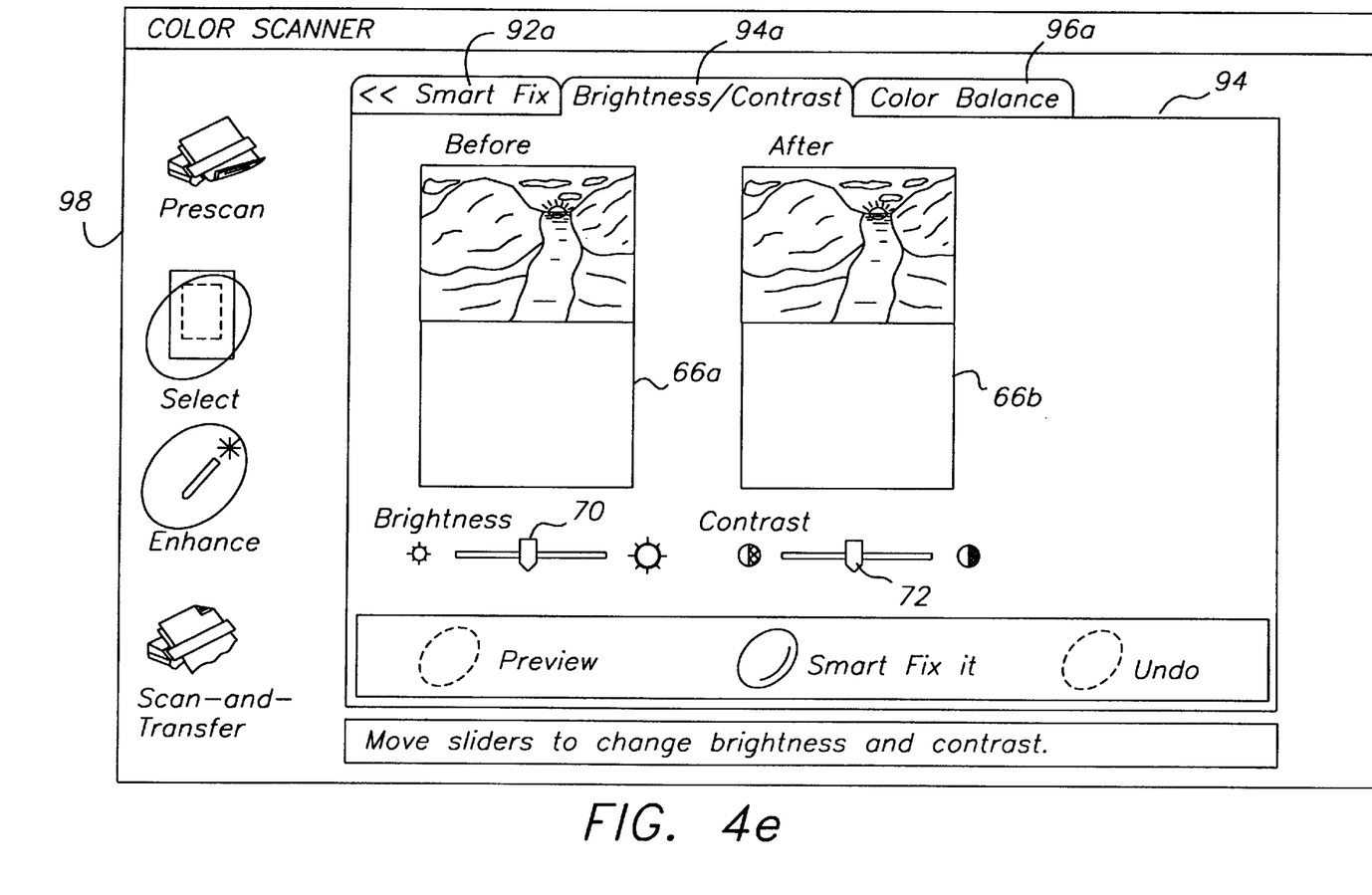
Figure 4F:
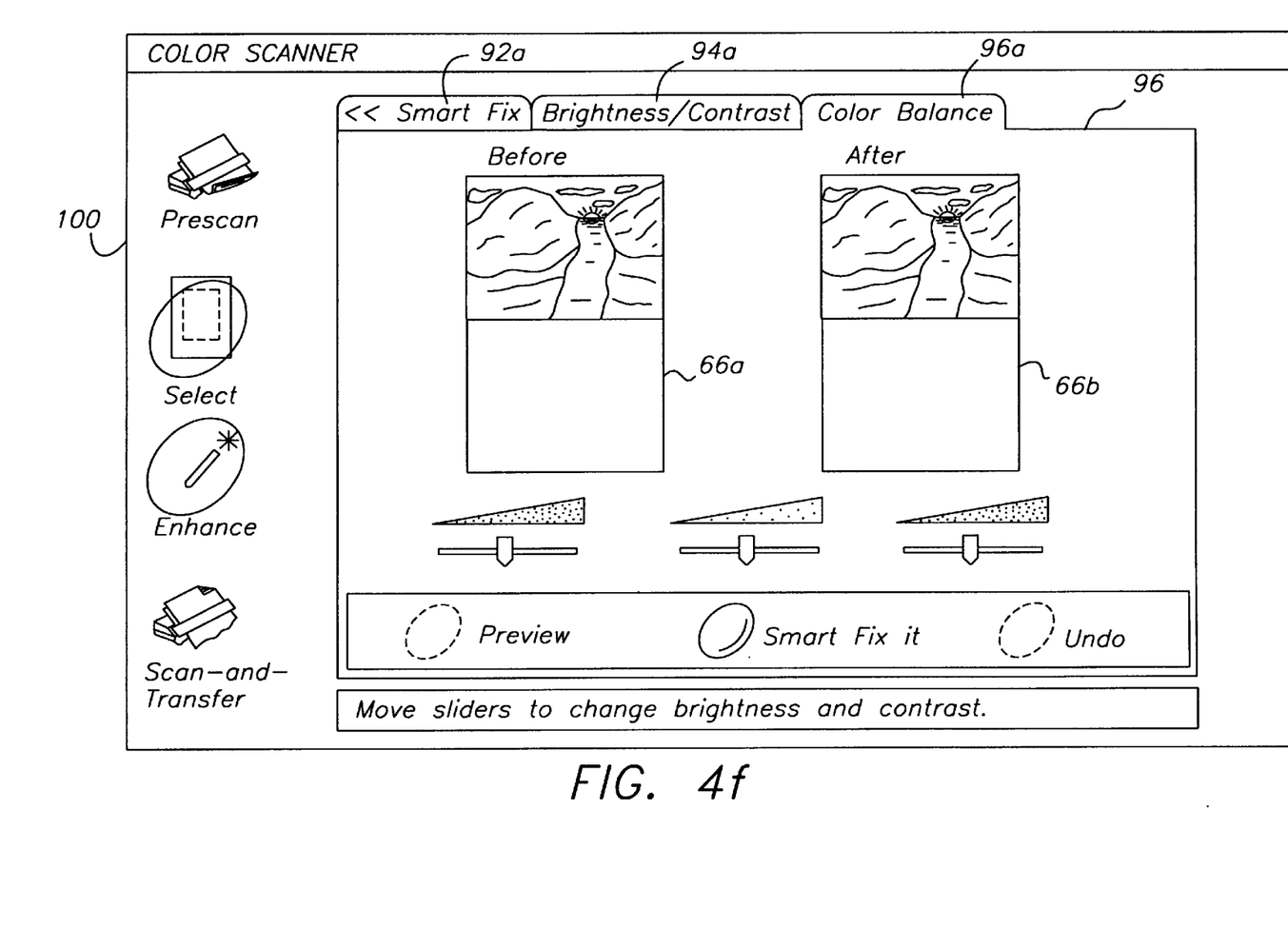

At this stage, the progressive disclosure function according to the invention is initiated, as shown in FIG. 4D through 4F, and as collapsed into one diagram in FIG. 6. Adopting the metaphor of a file folder with a user-accessible tab, the enhancement option screen 90 is displayed with a smart fix folder 92 having a smart fix tab 92a. The smart fix folder 92 is displayed as if overlying another folder with an exposed custom fix tab 92b. "SmartFix" represents a user option that automatically corrects the image according to predetermined brightness/contrast and color balance parameters. If the smart fix button 62 is clicked (step 136), the modified image is shown in the after window 66b (step 138). "Custom fix" represents an option than can be accessed by the user to individually set brightness/contrast and color balance.

However, all of the options are not immediately presented to the user. Instead, as also shown in FIG. 6, the custom fix tab 92b is progressively expanded into a brightness/contrast folder 94 and a color balance folder 96 each having respective user-accessible tabs 94a and 96a If the custom fix tab 92a is clicked, then a brightness/contrast screen 98 is displayed (step 140) as shown in FIG. 4E containing the brightness/contrast folder 94. The user can then adjust the brightness slider 70 and the contrast slider 72 until the image in the after window 66b attains the desired brightness and contrast (step 142). Then the user can click on the color balance tab 96a and the scene balance adjustment screen 100 is displayed (step 144) as shown in FIG. 4F. The user can then adjust the respective red, green, and blue sliders 74, 76, and 78 until the image in the after window 66b attains the desired color balance (steps 146, 148). If the user is now satisfied with the image, the scan and transfer icon 58 is clicked and the scan and transfer screen 80 is displayed (step 116). This is the last chance for the user to change the document type and scanning resolution. If all parameters are set to the user's satisfaction, then the start scan button 82 is clicked and the high resolution scan is initiated.

The invention has been described with reference to a preferred embodiment. However, it will be appreciated that variations and modifications can be effected by a person of ordinary skill in the art without departing from the scope of the invention.

| PARTS LIST | |
|---|---|
| 10 | host computer |
| 12 | cable |
| 14 | input scanner |
| 16 | scanning platen |
| 18 | lid |
| 20 | document |
| 22 | scanning mechanism |
| 24 | processor |
| 26 | keyboard |
| 28 | mouse |
| 30 | monitor |
| 32 | start button |
| 34 | sequence of screens |
| 36 | mode selection screen |
| 38 | sequence of expert screens |
| 40 | sequence of step by step screens |

-continued

| PARTS LIST | |
|---|---|
| 50 | image type/resolution screen |
| 52 | image description field |
| 54 | scanning detail field |
| 56 | prescan icon |
| 58 | scan and transfer icon |
| 60 | enhancement select screen |
| 62 | smart fix button |
| 64 | custom fix button |
| 66 | image window |
| 68 | enhancement screen |
| 70 | brightness slider |
| 72 | contrast slider |
| 74 | red slider |
| 76 | green slider |
| 78 | blue slider |
| 80 | scan and transfer screen |
| 82 | start scan button |
| 84 | scan options screen |
| 85 | image select screen |
| 86 | start prescan button |
| 87 | preview image |
| 88 | select icon |
| 89 | select frame |
| 90 | enhancement option screen |
| 92 | smart fix folder |
| 92a | smart fix tab |
| 92b | custom fix tab |
| 94 | brightness/contrast folder |
| 94a | brightness/contrast tab |
| 96 | color balance folder |
| 96a | color balance tab |
| 98 | brightness/contrast screen |
| 100 | scene balance adjustment screen |

What is claimed is:

1. A graphical system for interfacing user selections with an image capture device by means of a series of display screens produced by a processor and presented to the user on a display device, said system comprising:
   means for initiating a setup process for establishing image capture, and
   means for generating a user graphical interferer having a plurality of display screens that are characterized by a set of screens that progressively permit an inexperienced user to modify the captured image in a series of steps, which steps are indicated in the progressive screens, and at least one screen for an experienced user which includes a plurality of image processing functions that are selectable by the experienced user, at least one of the inexperienced user screens including user accessible icons which are expandable into additional screens according to user intervention, wherein user interaction with a selected icon of a selected screen produces two or more additional screens related to the selected icon.

2. A graphical system as claimed in claim 1 wherein the user graphical interface is based on a file folder metaphor, said user graphical interface represented by one or more folders having the user accessible icons represented by one or more user accessible tabs on the folders which are expandable according to user intervention, wherein user interaction with a selected tab produces two or more additional folders related to the selected tab.

3. A graphical system as claimed in claim 2 wherein the folders are superimposed on the display such that the top folder is displayed so as to obscure the underlying folders to the extent that the tabs of one or more underlying folders remain displayed for user interaction therewith.

* * * * *